United States Patent [19]

Jones-Fenleigh et al.

[11] Patent Number: 5,785,528
[45] Date of Patent: Jul. 28, 1998

[54] EDUCATIONAL KIT

[75] Inventors: Leigh Melaine Jones-Fenleigh; Shelley Louise Jones-Fenleigh, both of Oadby; James Dorian Gibson, Ieicester, all of Great Britain

[73] Assignee: Invicta Toys & Games Limited, Oadby, England

[21] Appl. No.: 677,538

[22] Filed: Jul. 10, 1996

[51] Int. Cl.⁶ .................................................. G09B 11/04
[52] U.S. Cl. ..................... 434/88; 434/85; 434/84; 434/100; 434/371
[58] Field of Search .................... 434/88, 371, 85, 434/84, 81, 99, 100, 91; 446/219, 146; 33/1 K, 1 F; 472/63

[56] References Cited

U.S. PATENT DOCUMENTS

| | | | |
|---|---|---|---|
| 3,484,952 | 12/1969 | Coldren | 434/88 |
| 4,457,717 | 7/1984 | Chika | 434/88 |
| 4,836,783 | 6/1989 | Harper | 434/88 X |

*Primary Examiner*—Jeffrey A. Smith
*Attorney, Agent, or Firm*—Loeb & Loeb LLP

[57] ABSTRACT

An educational device having a housing with a flat surface to which a mirror is removable attached. A transparent or translucent sheet removable positioned over the mirror. A marking implement enables a user to apply marks to his or her own reflection in the mirror.

7 Claims, 2 Drawing Sheets

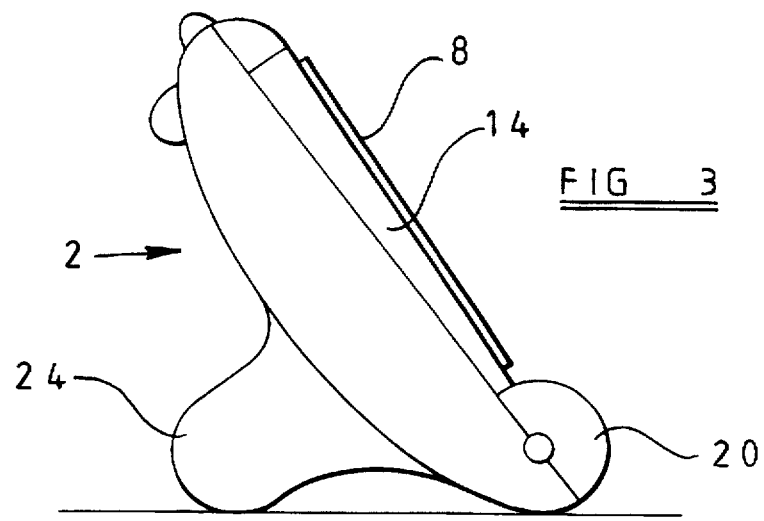
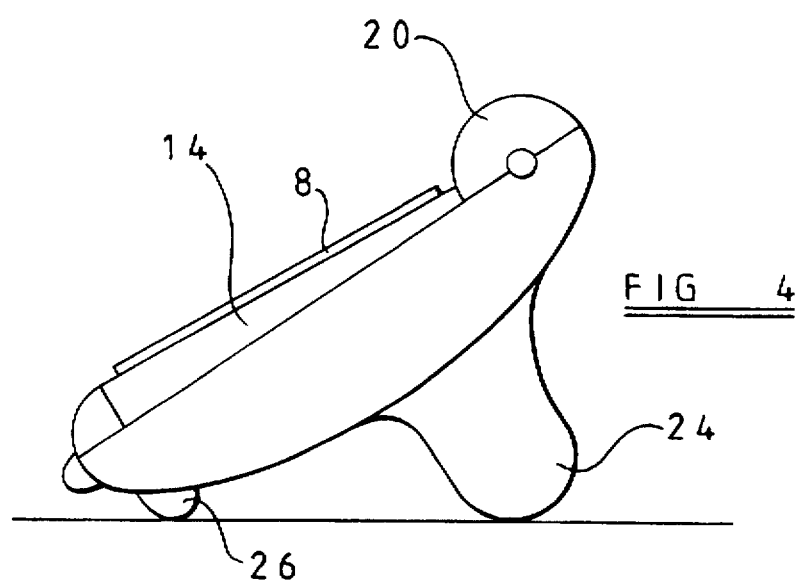

EDUCATIONAL KIT

This invention relates to an educational device especially, but not exclusively, for young children.

Colouring in shapes or tracing lines will help a child or other user to improve his or her hand-to-eye co-ordination.

It is an object of the present invention to provide an educational device intended for this purpose.

According to the invention there is provided an educational device comprising a housing with a flat surface to which a mirror is removably attached a transparent or translucent sheet removably positioned over the mirror, and a marking implement to enable a user to apply marks to his or her own reflection in the mirror.

Lighting means may be provided to improve the visibility of the user's reflection.

The transparent or translucent sheet may bear images or pictures. Suitably, the or each sheet is made from paper or plastics.

Suitably, the educational device may have legs arranged such that, when it is positioned on a horizontal surface, the flat surface and the mirror point diagonally upwards.

The legs may be of the form of protrusions from the housing of the educational device. These protrusions may allow the educational device to be positioned in more than one stable orientation, such that the normal to the mirror forms different angles relative to the horizontal.

Suitably, the marking implement may be a crayon including a water soluble crayon, pen, pencil or cosmetics.

Preferably, the mirror is held onto the flat surface of the educational device by a frame which may or may not have one or more missing sides.

The flat surface of the educational device may be removed from the housing or alternatively may be pivoted about hinges on the housing to allow access to the inside of the housing.

The educational device may be of a size and shape which is easily portable by a child for which purpose a handle may be provided.

The educational device may be constructed from plastics, lightweight metal, wood or a combination of these materials.

The housing may include a hinged compartment for the storage of marking implements and/or other items.

A preferred embodiment of the invention will now be described by way of example only with reference to the accompanying drawings in which FIG. 1 is a perspective view of an educational device according to the invention;

FIG. 3 is a view similar to that of FIG. 2 but with the lid in a closed position, with the housing disposed in a first position, and FIG. 4 is a view of the educational device from the same side as that depicted in FIG. 3, with its housing disposed in a second position.

Figure 1:
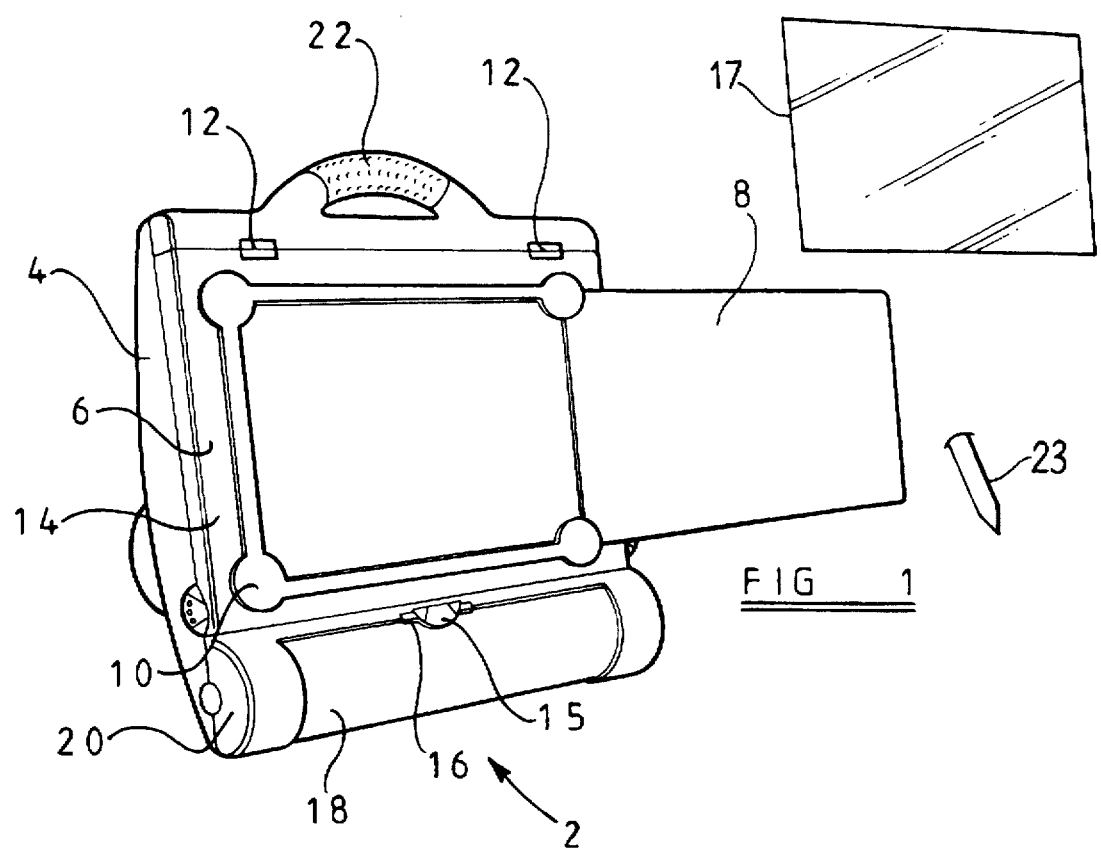

Referring first to FIG. 1, an educational device 2 consists of a housing 4 with a flat surface 6 and a mirror 8. The mirror 8 is held in place on the flat surface 6 by a frame 10. The frame 10 comprises three sides of a rectangle, and the mirror 8 may be removed from the frame 10 by sliding it through the fourth or missing side. The frame 10 is raised above the flat surface 6 of the housing 4 to form a lip which protrudes over the edges of the mirror 8 and secures it in place. The lip of the frame 10 also guides the mirror when it is being removed from or returned to the flat surface 6 of the housing 4. In FIG. 1, the mirror 8 is partially removed from the frame 10.

The flat surface 6 of the housing 4 is hinged about two hinges 12 to form a lid 14. Opening the lid 14 allows access to the inside of the housing 4 which is hollow. The inside of the housing 4 may thus be used to store items for use in association with the educational device 2.

Part of the lid 15 is designed to protrude through a slot 16 in the housing 4 when the lid 14 is in the closed position. This allows the lid 14 to be maintained in a closed position, as by a conventional detent.

A transparent or translucent sheet 17 may be placed on top of the mirror 8 when it is in position in its frame 10. The clearance between the mirror 8 and the frame 10 is such that the sheet may be accommodated in the frame 10 above the mirror 8. The sheet may be of paper or an at least partially light-transmitting polymer such as polystyrene, acetate, or H.I.P. polyflex and may be coated with a layer of varnish.

The housing 4 of the educational device 2 incorporates a generally cylindrical compartment 20. The compartment 20 includes a cover 18. The mechanism used to lock the lid 14 of the housing 4 closed also maintains the cover 18 of the compartment 20 closed.

A handle 22 is provided on the housing, above the mirror 8 to allow easy portability of the educational device 2.

Figure 2:
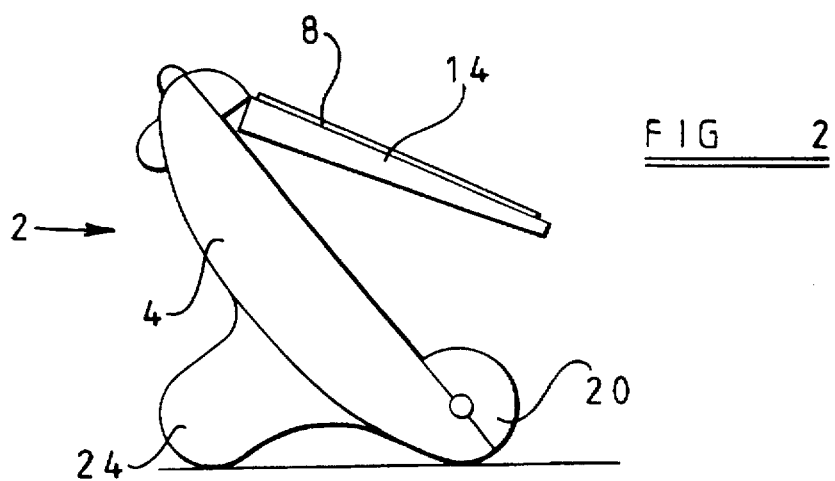
FIG. 2 is a view from the side of the educational device showing a lid in a partially opened position.

In FIG. 2, the lid 14 of the housing 4 is shown hinged in a partially open position. The housing 4 has a large protrusion 24 positioned laterally at the centre and near to the base of the device 2.

The protrusion 24 acts in combination with the base of the cylindrical compartment 20 to provide a configuration which gives the educational device 2 a stable base. The educational device 2 may be positioned on a surface such that it rests on the protrusion 24 and the base of the cylindrical compartment 20. If the lid 14 is in the closed position, the mirror 8 will point diagonally upwards when the educational device 2 is placed on the surface. This is shown more clearly in FIG. 3.

The educational device may be positioned in a second stable orientation such that it rests on protrusion 24 and two further protrusions 26, as shown in FIG. 4. In this configuration, the mirror 8 points diagonally upwards at a lesser angle than that depicted in FIG. 3.

In use, a child or other user is positioned in front of the educational device 2 such that he or she can see his or her own reflection in the mirror 8. A transparent or translucent sheet is placed over the mirror 8, and the user may then use one or more crayons 23 or other marking implements to trace the outline of, or apply colour to, his or her reflection.

In particular, the educational device 2 may be used to teach, for example, a user how to apply cosmetics to his or her face. In a first arrangement, the educational device 2 is used conventionally as a mirror and the user applies cosmetics or suitable crayons directly onto her face. In a second arrangement, suitably coloured crayons are applied to the reflection of the user's face in the mirror 8 of the educational device 2, on a transparent or translucent sheet positioned over the mirror 8.

When the user has finished marking the sheet, it may be removed from the mirror.

It will be appreciated that the mirror 8 may be a flat piece of glass with a metallic backing. Alternatively, the mirror may be constructed from a combination of plastics with a metal, typically silver, backing coating, a single piece of polished metal or some combination of metal and plastic or plastic or mirrored card.

The function of the two hinges 12 may be performed by some other form of hinging mechanism. For example, a single piano-type hinge extending across the length of the lid 14 may be used. Alternatively, the hinging function may be performed by fashioning the housing 4 such that an integrally moulded thin flexible piece of plastic connects the lid 14 and the housing 4.

The transparent or translucent sheet (not shown) positioned on the mirror 8 may be replaced by any one of a plurality of other sheets. Suitably these sheets may be stored inside the housing of the educational device. The replacement sheet may be transparent or translucent, and may bear images and pictures. If desired, more than one sheet may be positioned on the mirror to, for example, overlay images printed on the sheets.

In an alternative embodiment (not shown), the frame incorporates a battery powered light which illuminates the mirror, improving the visibility of the user's reflection.

In a still further embodiment, lighting means to illuminate the mirror is provided in the handle of the educational device.

We claim:

1. An educational kit comprising:
    a housing molded from plastic material, said housing having a part providing a flat surface;
    a mirror;
    a frame for holding the mirror on said flat surface, said frame having an open side to allow a user to slide the mirror into and out of the frame;
    a transparent or translucent sheet removably positionable over said mirror;
    a marking implement to enable the user to apply marks to his or her own reflection in the mirror; and
    a protrusion molded integrally with said housing and extending from said housing, away from said part providing a flat surface, said protrusion being located to allow said housing to be positioned in more than one stable orientation, such that in different orientations, the normal to the mirror forms different angles relative to the horizontal.

2. An educational kit as set forth in claim 1 wherein the transparent or translucent sheet is made from paper or plastics.

3. An educational kit as set forth in claim 1, wherein said protrusion is arranged on said housing such that, when the housing is positioned on a horizontal surface, the flat surface and the mirror point diagonally upwards.

4. An educational kit as set forth in claim 1 wherein the marking implement is a water soluble crayon, a pen, a pencil, or cosmetics.

5. An educational kit as set forth in claim 1 wherein the flat part is pivotable about hinges on the housing to allow access to the inside of the housing.

6. An educational kit as set forth in claim 1 further comprising a handle connected to said housing to render the device easily portable by a child.

7. An educational kit as set forth in claim 1 wherein said part is a cover hinged to said housing and covering a storage compartment provided within said housing.

* * * * *